Jan. 5, 1937.  M. R. WOLFARD  2,066,922
MANIFOLD FOR MULTICYLINDER INTERNAL COMBUSTION ENGINES
Filed March 7, 1935  3 Sheets-Sheet 3

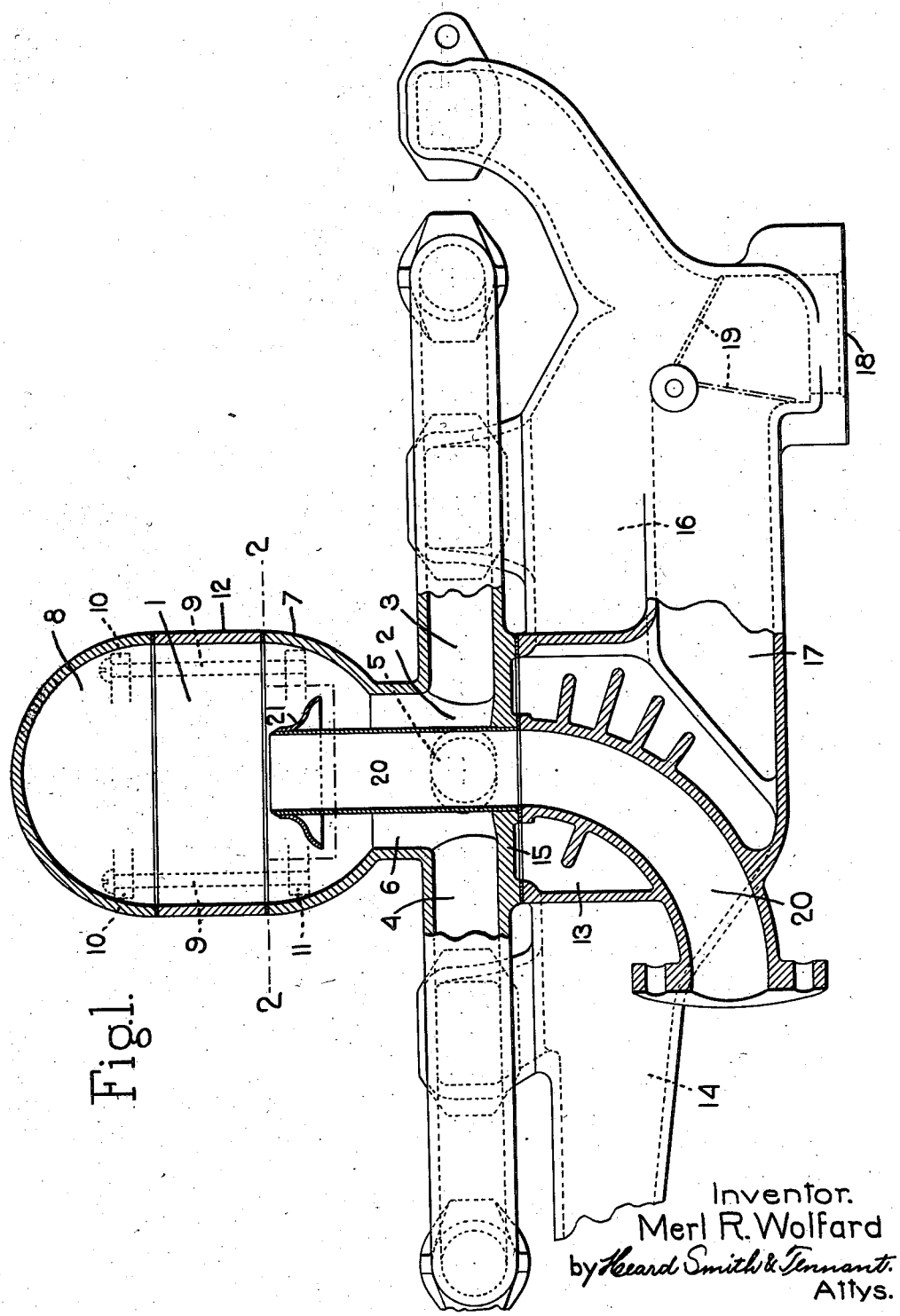

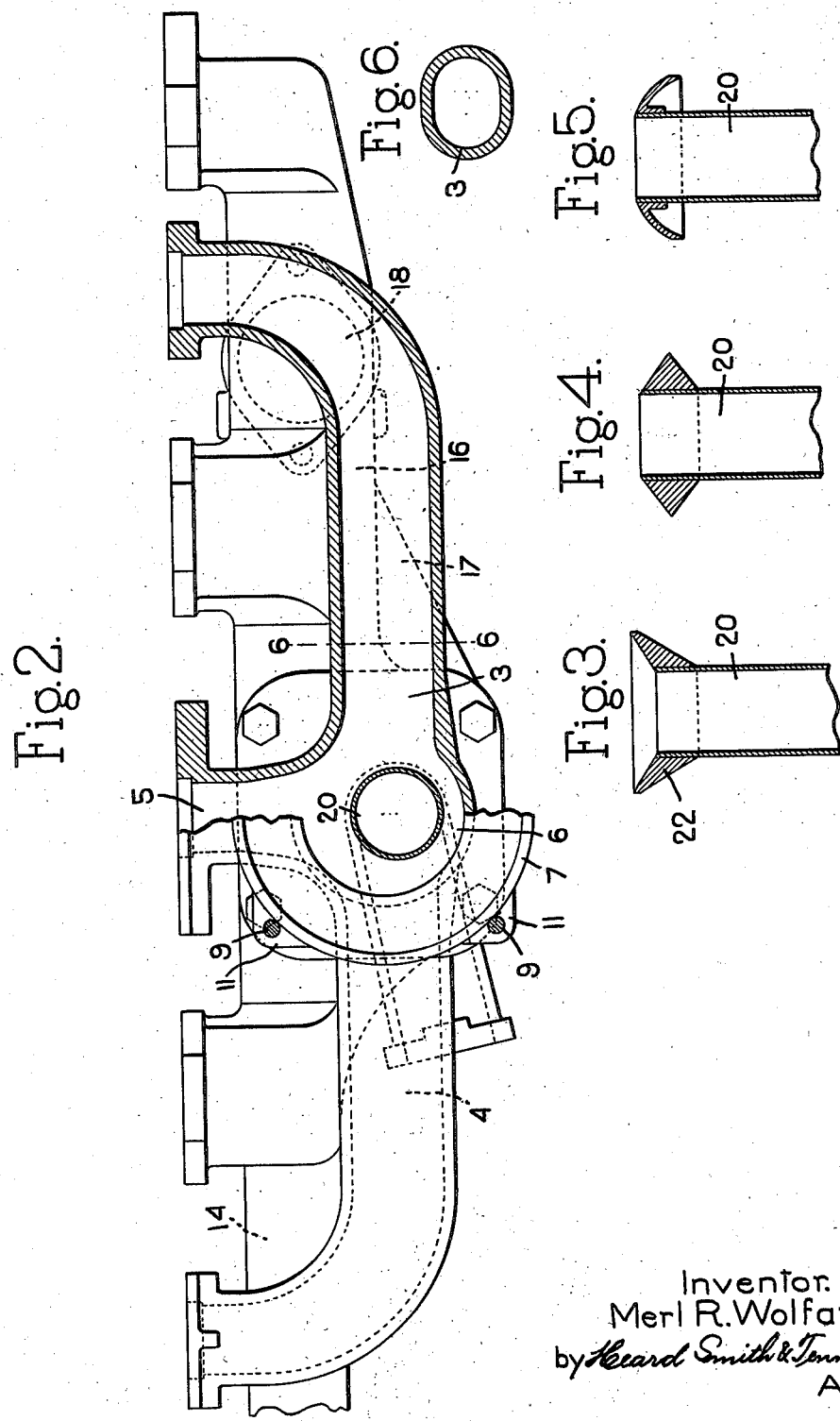

Inventor.
Merl R. Wolfard
by Heard Smith & Tennant.
Attys.

Patented Jan. 5, 1937

2,066,922

UNITED STATES PATENT OFFICE 2,066,922

MANIFOLD FOR MULTICYLINDER INTERNAL COMBUSTION ENGINES

Merl R. Wolfard, Cambridge, Mass., assignor to Hopewell Brothers, Watertown, Mass., a co-partnership composed of Charles F. Hopewell and Helen C. Hopewell Application March 7, 1935, Serial No. 9,787

15 Claims. (Cl. 123—52)

This invention relates to improvements in manifold systems for multi-cylinder internal combustion engines, and the general object of the invention is to provide means for delivering a properly proportioned fuel-air mixture from any suitable mixing device, such as a carbureter, to all the cylinders of the engine in such manner that each cylinder will receive the same ratio of fuel to air as is supplied by the carbureter at whatever speed or torque the engine is operating.

More particularly the invention relates to improvements in manifolds for multi-cylinder internal combustion engines of the type disclosed in my prior Patent No. 1,956,606 granted May 1, 1934, which comprises a mixture-receiving chamber having an upper energy-dissipating section and a lower distributing section of smaller volume than said upper section, with conduits leading from said distributing section to the cylinders of the engine, and means for supplying a properly proportioned fuel-air mixture including a delivery tube arranged to discharge the mixture upwardly into said energy-dissipating section of the mixture-receiving chamber.

One of the objects of the invention is to reduce and substantially to eliminate eddy currents and surges caused by reversely flowing currents of fuel-air mixture in the energy-dissipating section or caused by irregularities in the walls of the lower part of the mixture-receiving chamber. This is acomplished in the present invention by providing a baffle surrounding the delievery tube near its discharge end acting to separate the major flow disturbances of the reversely flowing currents of fuel-air mixture in the energy-dissipating section.

A further object of the invention is to provide means which will prevent the accumulation of sizable globules of liquid fuel which might collect upon the upper or lower surface of the baffle and thereby tend to cause intermittent increase and decrease in the supply of fuel to the distributing section. This is accomplished by providing a baffle presenting surfaces inclined to the axis of the delivery tube. Such inclination may be either upwardly or downwardly away from the delivery tube, whereby liquid will flow freely therefrom.

It has long been recognized and proven by tests that in manifolds for multi-cylinder internal combustion engines, particularly in the conventional type used on six-cylinder engines, the mixture delivered to the respective cylinders varies greatly (as much as 15% or more) under some operating conditions. This is caused principally by changes in velocity of the mixture passing through manifold branches having different lengths leading from the distributing section of the manifold to the respective cylinders of the engine. The disturbing effect of surges in conduits of different lengths increases with the increase in speed and also with the increase in density of the fuel-air mixture which in throttle-governed engines increases with torque.

In-so-far as forward surges—toward the cylinders—are concerned, that is the tendency to "ram", this subject has received extended mathematical analysis and various structures have been proposed to minimize the effect of "ram" in the longer conduits. So far as I am aware little consideration has been given by others to the effect of the back surge at the distributing section of the manifold which follows the forward surge or "ram".

In a high speed engine during the induction stroke of the piston in any one of the cylinders which is connected to a long conduit leading from the distributing section of the manifold, the velocity of the gas in the conduit increases to a maximum near the middle portion of the travel of the piston, decreases thereafter and is stopped suddenly by the closing of the inlet valve, thus causing a very substantial compression in the gaseous column near the inlet valve. This compression immediately reacts causing a back flow or surge toward and into the distributing section which causes liquid particles entrained in the air to be projected into an opposite conduit leading to another cylinder or to be deposited against an opposite wall of the distributing section of the manifold.

My observations and tests indicate that the influence of this back surge at the distributing section is one of the main causes of the alteration in the fuel-air ratio as delivered to the different cylinders of the engine. This is particularly true in respect to three-branch manifolds such as are used on six cylinder engines in which the long branches are in substantial alinement and the short third branch is approximately at right angles thereto.

The disturbing influence of these surges is augmented in six-cylinder engines where the usual firing order is 1, 5, 3, 6, 2, 4, in that the back surges in each long branch twice project particles of liquid fuel into the opposite long branch before the introduction of the charge into the cylinder from such opposite long branch takes place. This augmented disturbance occurs once in each long branch during a complete cycle in the six cylinders.

The effect of the disturbances produced by back surges upon the fuel introduced into the distributing section of the manifold in usual constructions is referred to in my prior Patent 1,956,606 granted May 1, 1934, in which a manifold construction is disclosed which comprises a mixture-receiving chamber having an upper energy-dissipating section and a lower distributing section with conduits leading therefrom to the cylinders of the engine and a delivery tube extending upwardly from the carburetor centrally through the distributing section into the upper energy dissipating section. The velocity created by the back surges in the conduits of the manifold is materially reduced by means of the energy-dissipating section and the delivery tube in the distributing section minimizes the projection of liquid particles from one of the long branches of the manifold into the opposite long branch thereof.

One of the objects of the present invention is to provide an improved construction in which the conduits of different lengths are so arranged relatively to the distributing section and the delivery tube as to cause liquid particles projected by the back surges in the longer conduits into the distributing section of the manifold to be thrown toward the entrance to the shorter conduits in such proportion that the ratio of fuel to air in the charges delivered to the respective cylinders of the engine will be substantially equal. This may be accomplished either by so locating the delivery tube in the distributing section as to act as a deflecting member to cause a larger proportion of the surging current to be diverted toward the shorter conduit, or by so positioning the entrance to the conduits at the distributing section in a proper angular relation to each other, together with the angular direction of the extension of the wall of said conduit contiguous to said distributing section as will direct the surging current in the longer branches of the manifold toward the other branches in such manner that the ratio of fuel to air in the charges delivered to the respective cylinders of the engine will be substantially equal.

A further object of the invention is to provide an energy-dissipating section, the lower portion of which is of gradually reduced cross sectional area merging into a distributing section having a gradually decreased cross sectional area as the floor thereof is approached to provide ample entrance area to the conduits, with a small and preferably smooth floor area in the distributing section to insure sweeping of the liquid from said floor area by the velocity of the air passing over the floor during each induction stroke of the engine.

Another object of the invention is to provide a manifold construction of such character that the inner wall of the lower portion of the mixture-receiving chamber may be readily machined to present a smooth finished surface free from pockets and irregularities such as may occur in a cast distributing section. This may be accomplished by making the distributing section and the contiguous portion of the energy-dissipating section of such form as may be readily bored, or otherwise machined, the upper portion of the energy-dissipating section being removable to permit access to the lower portion.

A further object of the invention is to provide a construction of the character described in which the volume of the energy-dissipating section may be readily changed to suit the idiosyncrasies residing in the differences in timing of the valve openings and arrangement of valve ports of internal combustion engines.

Another object of the invention is to provide a manifold system comprising an inlet manifold of the character set forth in combination with a heating chamber in the exhaust manifold with separate passages leading from said heating chamber to the outlet of the exhaust manifold, and a valve selectively operable in conjunction with the said separate passages to cause the products of combustion from all the branches of the exhaust manifold to flow through the heating chamber around the delivery tube or to cause a major portion of said gases to be discharged from said manifold without flowing around the delivery tube.

These and other objects and features of the invention will more fully appear from the following description and the accompanying drawings and will be particularly pointed out in the claims.

In the drawings:

Fig. 1 is a side elevation, partially in vertical section, of the manifold system embodying the invention;

Fig. 2 is a plan view on lines 2—2 Fig. 1, a part of the intake manifold being shown in section;

Fig. 3 is a detail view in vertical section showing the upper portion of a delivery tube having a baffle presenting an upwardly inclined upper and lower surface extending outwardly from the delivery tube;

Fig. 4 is a detail view in vertical section of the upper portion of a delivery tube showing a baffle presenting a downwardly inclined upper surface and an upwardly inclined lower surface extending outwardly from the delivery tube;

Fig. 5 is a vertical sectional view of the upper portion of a delivery tube showing a baffle mounted thereon near its discharge end presenting upper and lower surfaces of generally spherical form extending outwardly and downwardly;

Fig. 6 is a vertical sectional view on lines 6—6 Fig. 2 of one of the long conduits leading to the cylinders of the engine;

Figure 10:
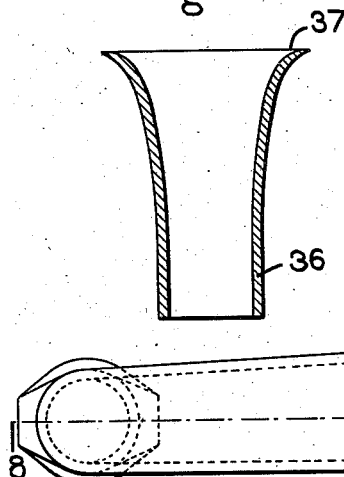
Fig. 10 is a detail view in vertical section showing a delivery tube in the form of a venturi with its discharge end flared and acting as a baffle; and, Fig. 11 is a vertical sectional view on lines 10—10 Fig. 7, of one of the long conduits of the three-branch manifold leading to the cylinders of the engine.

The manifold construction as shown in Figs. 1 and 2 of the drawings comprises a central mixture-receiving chamber having an upper energy-dissipating section 1 and a lower cylindrical distributing section 2, with conduits 3, 4, and 5, leading from the distributing section respectively to ports in the cylinder block of the engine. The conduits leading to the cylinders of the engine, the distributing section 2, and the lower cylindrical portion 6 of the energy-dissipating section contiguous thereto and an enlarged, preferably hemispherical portion 7 of the energy-dissipating section, desirably are formed as an integral casting.

The upper portion of the energy-dissipating section preferably is in the form of a hemispherical cap 8 with its lower edge complementary to the upper edge of the lower hemispherical portion 7 of said chamber. The cap 8 of the energy-dissipating section desirably is detachably secured to the lower section 7 by cap screws 9 passing through bosses 10 extending outwardly from the cap and adapted to screw into suitable lugs 11 extending outwardly from the wall of the hemispherical portion 7. The lower face of the cap 10 may seat upon the upper face of the lower hemispherical portion 7, thereby providing a substantially spherical energy-dissipating section, or if desired a cylindrical ring 12 of any predetermined height may be interposed between the lower face of the cap and the upper face of the lower hemispherical portion to provide an energy-dissipating section of the desired volume to suit the idiosyncrasies residing in the differences in timing of the valve openings and arrangement of valve ports of the internal combustion engine to which the manifold is attached.

Desirably a heating chamber 13 in the central portion of the exhaust manifold 14 is located below the bottom wall 15 of the distributing section 2 of the inlet manifold. The exhaust manifold is preferably an integral casting provided with separate passages 16 and 17 leading from the heating chamber 13 to the exhaust outlet 18. A valve 19, located at the junction of the passages 16 and 17 with the outlet passage 18, is operable when in the position indicated by dotted lines to cause the products of combustion from all of the branches of the exhaust manifold to flow through the heating chamber and thence out through the passage 17 to the outlet 18. When the valve 19 is in the position illustrated in dot and dash lines, the major portion of the products of combustion flow directly toward the outlet 18 and are discharged without being circulated in the heating chamber 13.

In the present construction, as in that disclosed in my prior patent aforesaid, means are provided for introducing fuel-air mixture into the mixture-receiving chamber in such manner as to prevent unequal concentration of the fuel particles within the mixture in any localized section of the chamber.

In the construction illustrated the means for introducing fuel-air mixture comprises a delivery tube 20 which leads from a suitable air-mixing device, such as a carburetor, through the heating chamber 13 and upwardly through the distributing section 2 into the energy-dissipating section. The fuel-air mixture being discharged from the upper end of the delivery tube into the energy-dissipating section, possesses a velocity corresponding to the requirements of the engine at any particular time. The direction of flow is reversed in the energy-dissipating section and flows downwardly through the circular section 6 into the distributing section 2, and thence into any one of the conduits leading to the cylinders of the engine.

In the present invention means surround the delivery tube near its discharge end which acts to separate the major portion of the oppositely flowing currents in the energy-dissipating section, thereby eliminating the major flow disturbances of the reversely flowing currents. The means for thus eliminating the major flow disturbances of the reversely flowing currents is preferably in the form of a baffle surrounding the delivery tube near its discharge end. This baffle may be of any suitable form presenting upper and lower surfaces inclined to the axis of the delivery tube acting to prevent the accumulation of any sizable globules of liquid fuel which might collect upon said surfaces and would tend to cause intermittent increase or decrease in the supply of fuel to the distributing section.

The baffle 21 illustrated in Fig. 1 is in the form of a pressed steel annulus which may be pressed into position around the upper end of the delivery tube 20 and presents upper and lower surfaces extending outwardly and downwardly therefrom.

As illustrated in Fig. 1 the delivery tube 20 is in the form of a cylindrical seamless tube having its lower end pressed into a suitable cylindrical bore in the bottom wall 15 of the distributing section 2 and forms an extension of the passage leading from the carburetor through the heating chamber 13.

Another form of baffle 22, surrounding the discharge end of the delivery tube 20, which is illustrated in Fig. 3, presents upper and lower surfaces inclined upwardly and outwardly from the wall of the delivery tube.

Another form of baffle, which is illustrated in Fig. 4, surrounding the upper end of the delivery tube, presents a downwardly inclined upper surface and upwardly inclined lower surface.

Another form of baffle, which is illustrated in Fig. 5, presents upper and lower surfaces of generally spherical form with a cylindrical boss surrounding and pressed upon the upper end of the delivery tube.

In the construction shown in Figs. 1 and 2 a usual manifold construction is illustrated in which the long branches or conduits are in substantial alinement. The delivery tube extends upwardly through the distributing section and in the present construction is placed eccentrically relatively to the vertical axis of the distributing section in such manner that the opening between the wall of the delivery tube and the wall of the distributing section establishing communication directly between a long conduit and the short conduit is of greater cross sectional area than the opening between the wall of the delivery tube and the wall of the distributing section establishing direct communication between the longer conduits.

By reason of this construction the delivery tube acts as a deflecting member to cause a larger proportion of a backwardly surging current to be diverted toward the shorter conduit, so that the liquid particles projected by the back surge in the longer conduits into the distributing chamber will be thrown toward the entrance to the shorter conduit in larger proportion and preferably in substantially as large proportion as is thrown toward the entrance to the other longer conduit.

The section of the longer conduits adjacent to the distributing section may be of oval form, as illustrated in Fig. 6, and merge into circular form as the engine block is approached. The principal reason for this construction is to provide a flat floor, without sharp corners, merging into upwardly extending walls, to facilitate the carrying forward of the liquid which tends to collect on the floor of the longer conduit.

Figure 7:
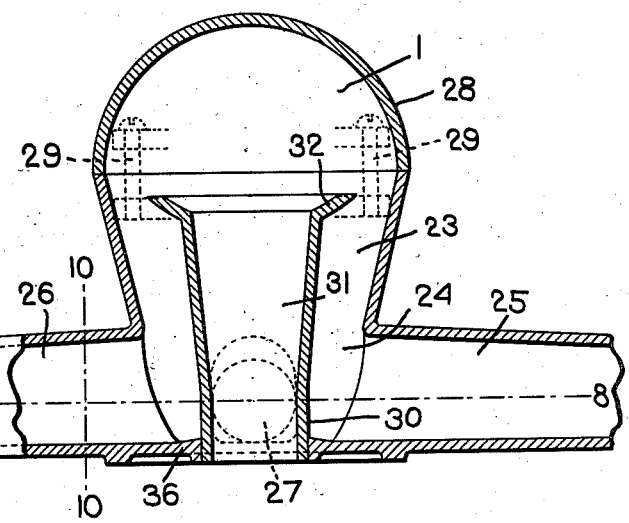
Fig. 7 is a view, mainly in longitudinal vertical section, of a modified form of the invention, showing the downwardly tapered lower portion of the mixture-receiving chamber merging into the distributing section which gradually decreases in area as the floor thereof is approached.
Figure 8:
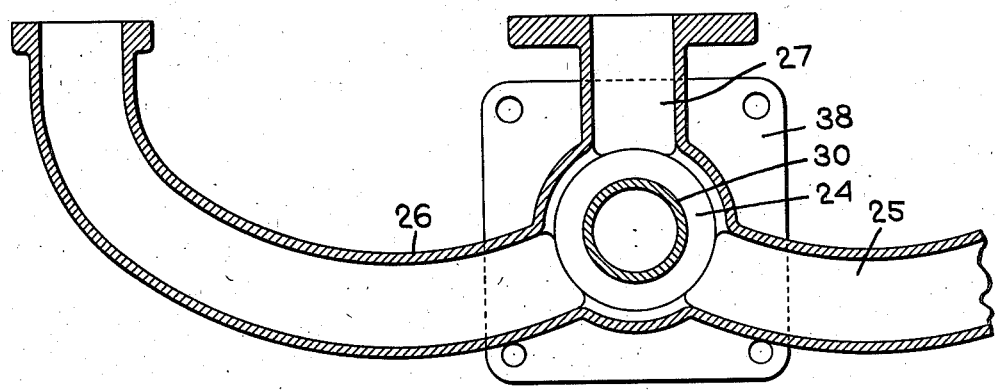
Fig. 8 is a view in horizontal longitudinal section of a modified form of manifold construction showing a three-branch manifold in which the conduits leading to the cylinders of the engine communicate with the distributing section at approximately equi-angular positions 120-degrees apart.

Another embodiment of the invention is illustrated in Figs. 7 and 8, in which the mixture-receiving chamber 1 has an energy-dissipating section, the lower portion 23 of which is of gradually reduced cross sectional area merging into a distributing section 24, also of gradually reduced cross sectional area, having long conduits 25 and 26 and a short conduit 27 leading therefrom to the cylinders of the engine, the upper portion of the energy-dissipating section being provided with a hemispherical cap 28 secured to the lower section by cap screws 29 in the manner heretofore described. The cap 28 is shown as secured directly on to the upper face of the lower portion of the energy-dissipating section, but may have a cylindrical section inserted between said upper face and the complementary face of said cap, as illustrated in Fig. 1, to provide an energy-dissipating section of the desired volume to suit the idiosyncrasies residing in the differences in timing of the valve openings and arrangement of the valve ports of the internal combustion engine to which the manifold is attached. In this construction the lower portion 30 of the delivery tube, which is inserted in the bottom wall of the distributing section is of cylindrical form extending approximately to the horizontal axis of the manifold and diverges outwardly therefrom into an upper portion 31 to give a Venturi-like action which gradually reduces the velocity of the upward flowing mixture therethrough before it is discharged into the energy-dissipating section. The baffle 32, which may be formed integral with the upper end of the delivery tube, presents upper and lower surfaces of generally spherical contour extending upwardly and outwardly from the delivery tube.

Figure 9:
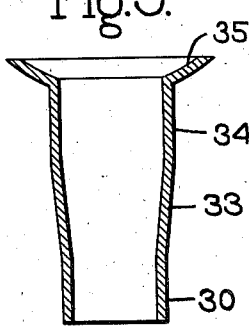
Fig. 9 is a detail view in vertical section showing a delivery tube with a portion of its length in the form of a venturi and a baffle at its discharge end of general spherical form extending upwardly and outwardly therefrom.

A modified form of delivery tube is illustrated in Fig. 9, in which the lower portion 32, which may be inserted in the bottom wall of the distributing section, is of cylindrical form and extends upwardly approximately to the horizontal axis of the manifold, then diverges outwardly forming a conical section 33 to produce a Venturi-like action, and then merges into a cylindrical section 34 at the upper or discharge end of the delivery tube. This cylindrical discharge section acts to smooth out the lines of flow before the mixture is discharged into the energy-dissipating section. The upper end of the delivery tube is provided with a baffle 35 similar in construction to the baffle 32, such as is illustrated in Fig. 7, and has been previously described.

A delivery tube of modified Venturi construction is shown in Fig. 10 having a lower portion 36 of cylindrical form and extending upwardly therefrom with progressively increasing area and its outlet end 37 sufficiently flared to act as a baffle.

The lower portion 23 of the energy-dissipating section, as illustrated in Fig. 7, may be conveniently of conical form to provide a distributing section of gradually decreasing area, with a small annular floor area 38 in combination with ample entrance area to the respective conduits. This insures the sweeping of the liquid fuel from the entire floor area by the velocity of the air passing over the floor during each induction stroke of the engine. This conical construction also permits smooth finishing of the inner surfaces of the side walls and of the annular floor of the distributing section.

It has heretofore been pointed out that in the construction shown in Figs. 1 and 2, the delivery tube is placed eccentrically relatively to the vertical axis of the distributing section, and acts as a deflecting member to cause a larger proportion of the backwardly surging current to be diverted toward the short conduit so that the liquid particles projected by the back surge in the longer conduits into the distributing chamber will be thrown toward the entrance to the shorter conduit in larger proportion, and preferably in substantially as large proportion, as is thrown toward the entrance to the longer conduit. This purpose is accomplished in the construction shown in Figs. 7 and 8 by so positioning the conduits and their angular direction of entrance to the distributing section as to cause liquid particles projected by the back surges from the longer conduits into the distributing section to be thrown at least equally as much toward the entrance to a shorter conduit as toward the entrance to a longer conduit.

Figure 11:
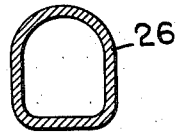

In the construction illustrated in Figs. 7 and 8 a three-branch manifold is shown, the angular direction of the entrance of the conduits 25, 26, and 27, to the distributing section, and their angular spacing relative to the center of the distributing section being such as to cause the liquid particles of fuel projected by the back surges in the longer conduits into the distributing section to be thrown toward the entrance to the shorter conduits in such proportion that the ratio of fuel to air in the charges delivered to the respective cylinders of the engine will be substantially equal. In this construction the longer conduits 25 and 26 leading to the remote cylinders of the engine are curved to avoid abrupt changes in the direction of flow of the mixture therethrough. Where the distributing section is of conoidal form, or otherwise gradually reduced in area as the floor of the distributing section is approached desirably the entrance to the conduits leading therefrom is elongated vertically, as illustrated in Fig. 11, and the cross section of each of the conduits merges gradually therefrom into a circular cross sectional area as the end, which is connected to the cylinder block, is approached.

The manifold construction illustrated in Fig. 8 may, except for the cap, be made integral and provided with a suitable rectangular base 36 which may be mounted over the heating chamber 13 and exhaust manifold, as illustrated in Fig. 1.

The operation of the invention in the embodiments thereof herein disclosed is similar. A properly proportioned fuel-air mixture is drawn by the suction of the engine through the delivery tube 20 and is heated during its passage through the portion of the delivery tube which extends through the heating chamber of the exhaust manifold. The fuel and air mixture is discharged upwardly from the delivery tube into the energy-dissipating section of the mixture-receiving chamber. The velocity of the mixture as discharged from the delivery tube is largely destroyed in the energy-dissipating section of the mixture-receiving chamber and the direction of flow is reversed as it passes downwardly around the baffle into the distributing section and thence outwardly through any one of the several conduits to a particular cylinder of the engine into which it is drawn by the induction stroke of the piston. The baffle surrounding the upper end of the delivery tube acts to eliminate the major flow disturbances of the reversely flowing currents of fuel and air in the energy-dissipating section of the mixture-receiving chamber. The baffles are so constructed as to present upper and lower inclined surfaces whereby the formation of sizable globules of liquid fuel on said surfaces is eliminated by the free flow of the liquid therefrom, thus avoiding intermittent increase and decrease in the supply of fuel to the distributing section.

As heretofore stated, in a high speed engine during the induction stroke of the piston in any one of the cylinders which is connected to a long conduit leading from the distributing section of the manifold, the velocity of the gas in the conduit increases to a maximum near the middle portion of the travel of the piston, decreases thereafter and is stopped suddenly by the closing of the inlet valve, thus causing a very substantial compression in the gaseous column near the inlet valve. This compression immediately reacts causing a back flow or surge toward and into the distributing section which causes liquid particles entrained in the air to be projected into an opposite conduit leading to another cylinder, or to be deposited against an opposite wall of the distributing section of the manifold.

In the present construction means are provided to equalize the proportion of liquid particles thus thrown toward different conduits caused by such a back surge. This is accomplished by so correlating the position and direction of entrance of the conduits to the distributing section in relation to the delivery tube that a back surge, particularly from the longer conduit will throw the liquid particles carried thereby in substantially equal proportion toward the entrance to other conduits, thus insuring substantial equality in the ratio of fuel to air in the charges delivered to the respective cylinders of the engine.

It will be understood that the particular embodiments of the invention disclosed herein are of an illustrative character and are not restrictive, and that various changes in form, construction and arrangement of parts may be made within the spirit and scope of the following claims.

Having thus described the invention, what is claimed as new, and desired to be secured by Letters Patent, is:

1. An inlet manifold for an internal combustion engine comprising a mixture-receiving chamber having an upper energy-dissipating section provided with a lower circular section of smaller volume presenting a smooth inner surface to avoid the presence of projections or recesses tending to create disturbing eddies in the flow of fuel-air mixture, conduits leading from the lower portion of said circular section to the cylinders of the engine, means for supplying a properly proportioned fuel-air mixture to said energy-dissipating section including a delivery tube having a smooth outside wall extending upwardly through said circular section, the cross sectional area of the annulus between the delivery tube, near the level of the upper wall of said conduits, and the wall of said circular section being more than one and one-half and less than four times the cross sectional area of the delivery tube, and a baffle surrounding the delivery tube near its discharge end presenting downwardly inclined upper and lower surfaces whereby liquid fuel will flow freely therefrom.

2. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, means for supplying a properly proportioned fuel-air mixture including a delivery tube extending upwardly through said distributing section into said energy-dissipating section, and a baffle surrounding the delivery tube near its discharge end.

3. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, means for supplying a properly proportioned fuel-air mixture including a delivery tube extending upwardly through said distributing section into said energy-dissipating section, said delivery tube having a portion of its length gradually enlarged to form a venturi, and having its upper end portion sufficiently flared to act as a baffle.

4. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, means for supplying a properly proportioned fuel-air mixture including a delivery tube extending upwardly through said distributing section into said energy-dissipating section, with a baffle near its discharge end having a diameter in the plane of its periphery more than four-tenths and less than eight-tenths of the diameter of said mixture-receiving chamber in said plane.

5. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, means for supplying a properly proportioned fuel-air mixture including a delivery tube extending upwardly through said distributing section into said energy-dissipating section, and a baffle surrounding the delivery tube near its discharge end, the upper and lower surfaces of said baffle being inclined downwardly, whereby formation of sizable globules of liquid fuel on said surfaces is eliminated by the free flow of the liquid therefrom.

6. An inlet manifold for a multi-cylinder internal combustion engine comprising a mixture-receiving chamber having an upper energy-dissipating section and a lower distributing section of smaller volume than said upper section, conduits leading from said distributing section to the cylinders of the engine, means for supplying a properly proportioned fuel-air mixture including a delivery tube extending upwardly through said distributing section into said energy-dissipating section, and a baffle in the form of a sheet metal stamping pressed around said delivery tube near its discharge end and presenting upper and lower surfaces extending at an acute angle to the axis of said delivery tube.

7. An inlet manifold for an internal combustion engine comprising a mixture-receiving chamber having an energy-dissipating section, the lower portion of which is of gradually reduced cross sectional area merging into a lower circular section presenting a smooth inner surface to avoid the presence of projections or recesses tending to create disturbing eddies in the flow of fuel-air mixture, conduits leading from the lower portion of said circular section to the cylinders of the engine, means for supplying a properly proportioned fuel-air mixture to said energy-dissipating section including a delivery tube having a smooth outside wall extending upwardly through said circular section, and a baffle surrounding the delivery tube near its discharge end presenting upper and lower surfaces extending at an acute angle to the axis of said delivery tube.

8. An inlet manifold for an internal combustion engine comprising a mixture-receiving chamber having an energy-dissipating section, the lower porion of which is of gradually reduced cross sectional area merging into a lower conical distributing section with a floor therein, said floor and said conical section presenting a smooth inner surface to avoid the presence of projections or recesses tending to create disturbing eddies in the flow of fuel-air mixture, conduits leading from said conical distributing section to the cylinders of the engine, means for supplying a properly proportioned fuel-air mixture to said energy-dissipating section including a delivery tube having a smooth outside wall extending upwardly through said conical distributing section whereby a small floor area in the distributing section is provided together with ample entrance area to said conduits.

9. An inlet manifold for a multi-cylinder internal combustion engine comprising a mixture-receiving chamber having an upper energy-dissipating section and a lower distributing section of smaller volume, conduits having different effective surge lengths leading from the distributing section to the cylinders of the engine, means for supplying a properly proportioned fuel-air mixture to said energy-dissipating section including a delivery tube extending upwardly through said distributing section, said conduits of different lengths being so arranged relatively to said distributing section and said delivery tube as to cause the liquid fuel particles projected by the back surges in the longer conduits into the distributing section to be thrown toward the entrance to a shorter conduit, in substantially as large proportion as toward the entrance to another longer conduit.

10. An inlet manifold for a multi-cylinder internal combustion engine comprising a mixture-receiving chamber having an upper energy-dissipating section and a lower circular distributing section of smaller volume, conduits having different effective surge lengths leading from the distributing section to the cylinders of the engine, means for supplying a properly proportioned fuel-air mixture to said energy-dissipating section including a delivery tube of circular cross section extending upwardly through said distributing section, the annular floor area of said distributing section being such as will insure the sweeping of the liquid from said floor by the velocity of the air passing over the floor during each induction stroke of the engine, said conduits of different lengths being so arranged relatively to said distributing section and said delivery tube as to cause the liquid fuel particles projected by the back surges in the longer conduits into the distributing section to be thrown toward the entrance to the shorter conduits in substantially as large proportion as toward the entrance to another longer conduit.

11. An inlet manifold for an internal combustion engine comprising a mixture-receiving chamber having an energy-dissipating section, the lower portion of which is of gradually reduced cross sectional area merging into a distributing section from which conduits having different effective surge lengths lead to the cylinders of the engine, means for supplying a properly proportioned fuel-air mixture to said energy-dissipating section including a delivery tube extending upwardly through said distributing section, said distributing section decreasing gradually in cross sectional area as the floor thereof is approached to provide ample entrance area to said conduits with a small floor area, said floor being smooth to insure the sweeping of liquid fuel from said floor by the velocity of the air passing over the floor during each induction stroke of the engine, said conduits of different lengths being so arranged relatively to said distributing section and said delivery tube as to cause the liquid fuel particles projected by back surges in the longer conduits into the distributing section to be thrown toward the entrance to the shorter conduits in substantially as large proportion as toward the entrance to another longer conduit.

12. An inlet manifold for a multi-cylinder internal combustion engine comprising a mixture-receiving chamber having an upper energy-dissipating section and a lower distributing section of smaller volume, means for supplying a properly proportioned fuel-air mixture to said energy-dissipating section including a delivery tube extending upwardly through said delivery section, three equally spaced conduits leading from said distributing section to the cylinders of the engine and extending from said distributing section in such directions relatively thereto and to said delivery tube as to cause the liquid fuel particles projected by the back surges in the longer conduits into the distributing section to be thrown toward the entrance to the shorter conduit in such proportion that the ratio of fuel to air in the charges delivered to the respective cylinders of the engine will be substantially equal.

13. An inlet manifold for a multi-cylinder internal combustion engine comprising a mixture-receiving chamber having an upper energy-dissipating section and a lower distributing section of smaller volume than said upper section, conduits of different lengths leading from the distributing section to the cylinders of the engine, means for supplying a properly proportioned fuel-air mixture including a delivery tube extending upwardly through said distributing section and discharging the fuel-air mixture into the energy-dissipating section, said delivery tube being eccentrically positioned in said distributing section in such manner that the opening between the wall of the delivery tube and the wall of the distributing section establishing communication directly between a long and a short conduit is of greater cross sectional area than the opening between the wall of the delivery tube and the wall of the distributing section establishing direct communication between the longer conduits.

14. An inlet manifold for an internal combustion engine comprising a mixture-receiving chamber having an upper energy-dissipating section provided with a lower circular section of smaller cross sectional area, conduits leading from the lower portion of said circular section to the cylinders of the engine, means for supplying a properly proportioned fuel-air mixture to said energy-dissipating section including a delivery tube extending upwardly through said circular section, and a baffle surrounding the delivery tube near its discharge end, said conduits, said circular section and the lower portion of said energy-dissipating section being formed integral and the upper portion of said energy-dissipating section being in the form of a cap detachably secured to said lower portion.

15. An inlet manifold for an internal combustion engine comprising a mixture-receiving chamber having an upper energy-dissipating section provided with a lower circular section of smaller cross sectional area, conduits leading from the lower portion of said circular section to the cylinders of the engine, means for supplying a properly proportioned fuel-air mixture to said energy-dissipating section including a delivery tube extending upwardly through said circular section, and a baffle surrounding the delivery tube near its discharge end, said conduits, said circular section and the lower portion of said energy-dissipating section being formed integral and the upper portion of said energy-dissipating section being in the form of a cap, a cylindrical middle portion interposed between said lower portion and said cap, and means for clamping said upper and lower portions together with the cylindrical portion therebetween, whereby the volume of said energy-dissipating chamber may be varied by the substitution of cylindrical portions having different heights.

MERL R. WOLFARD.